3,349,791
DIRECTIONAL FLOW CONTROL APPARATUS
Hector E. Guzman and George E. Keefer, Toledo, Ohio, assignors to Owens-Illinois, Incorporated, a corporation of Ohio
Filed July 12, 1965, Ser. No. 471,195
16 Claims. (Cl. 137—309)

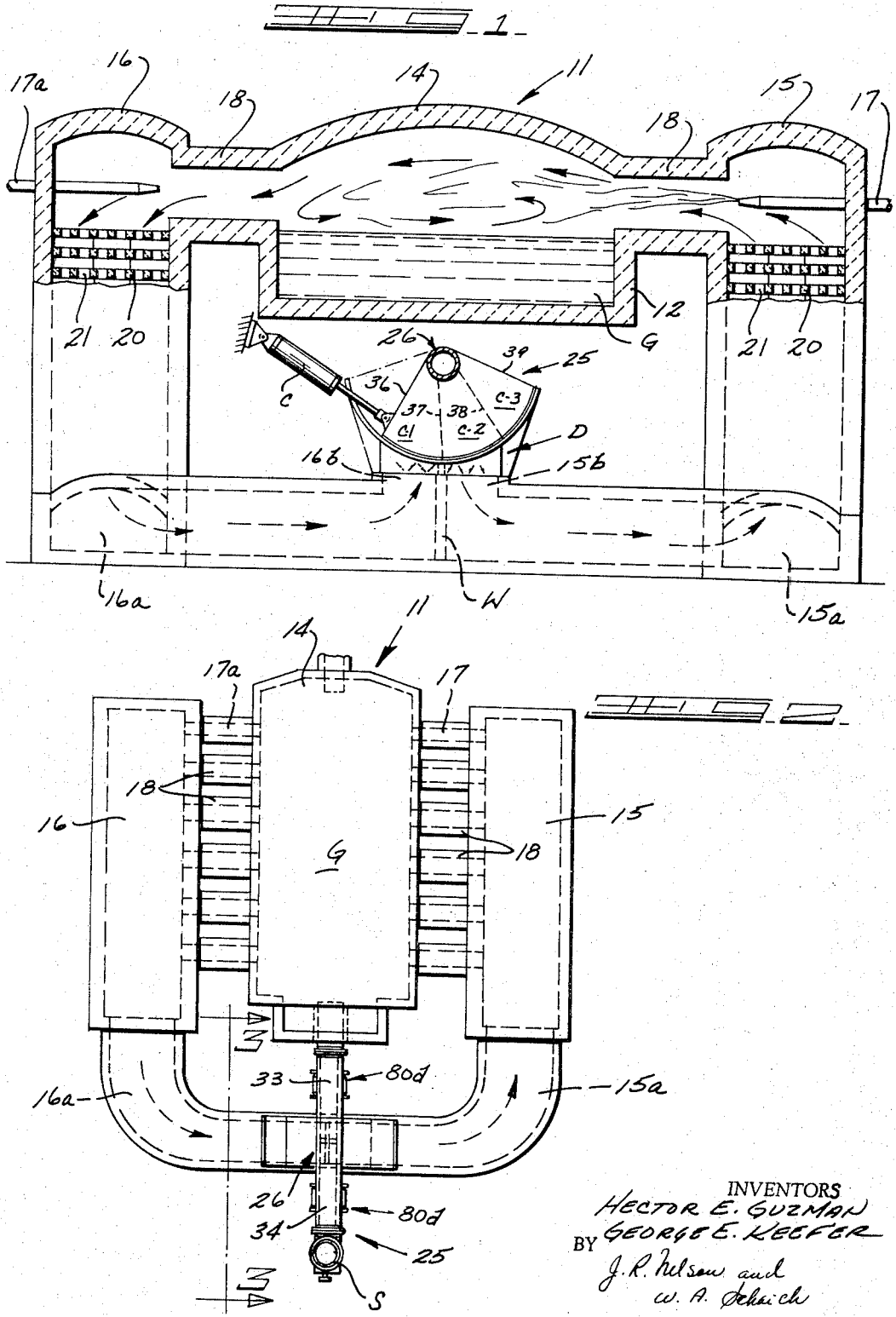

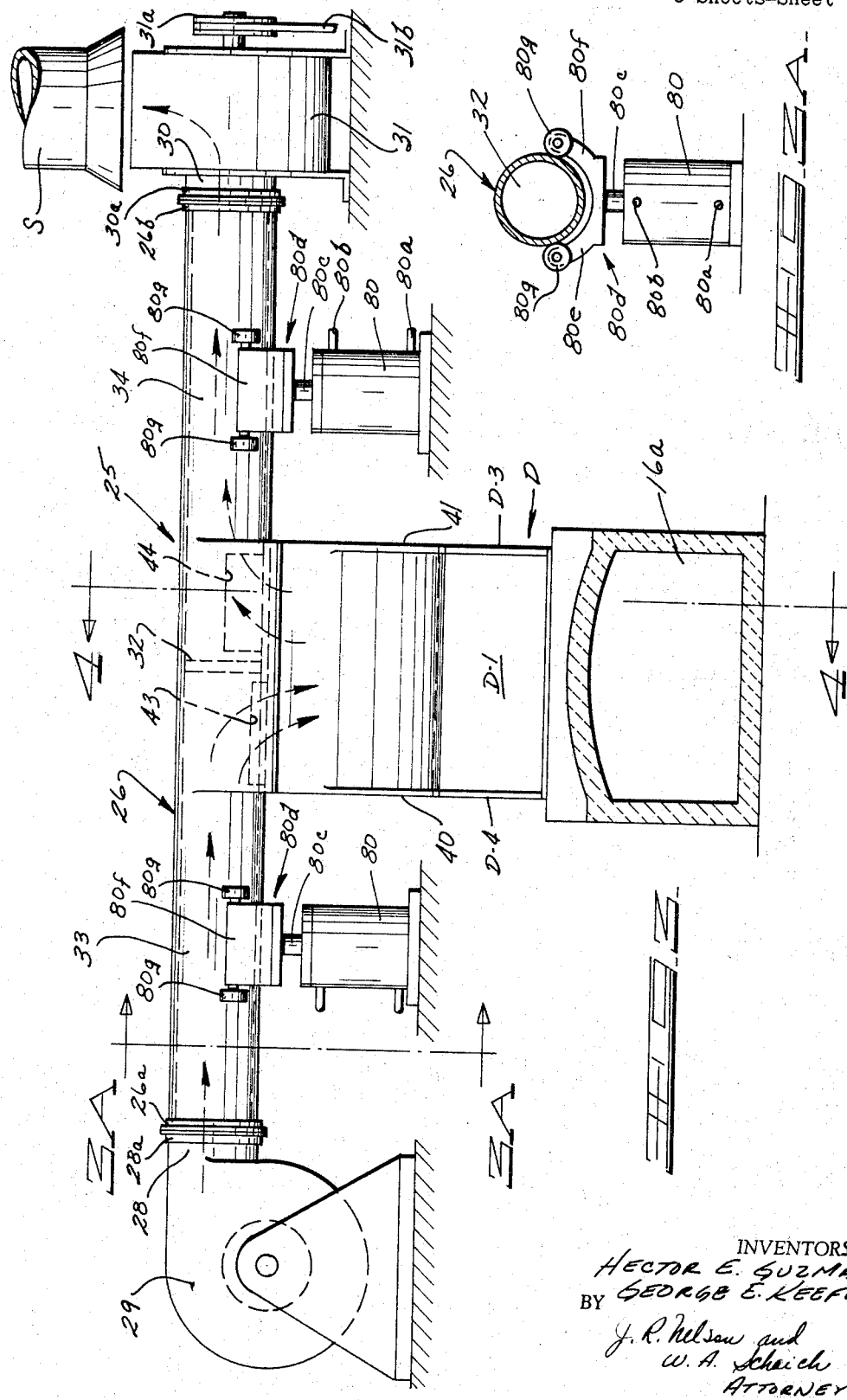

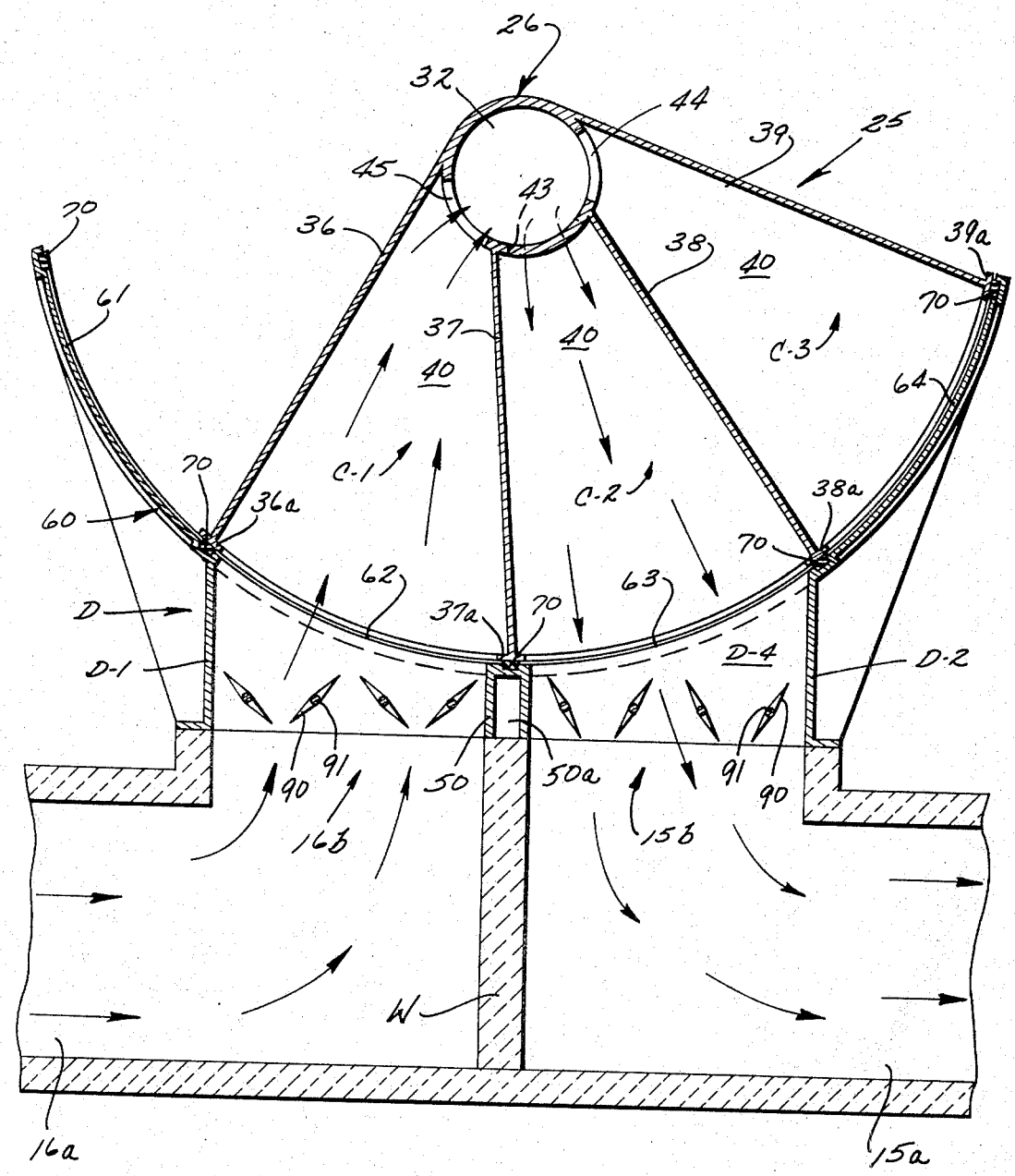

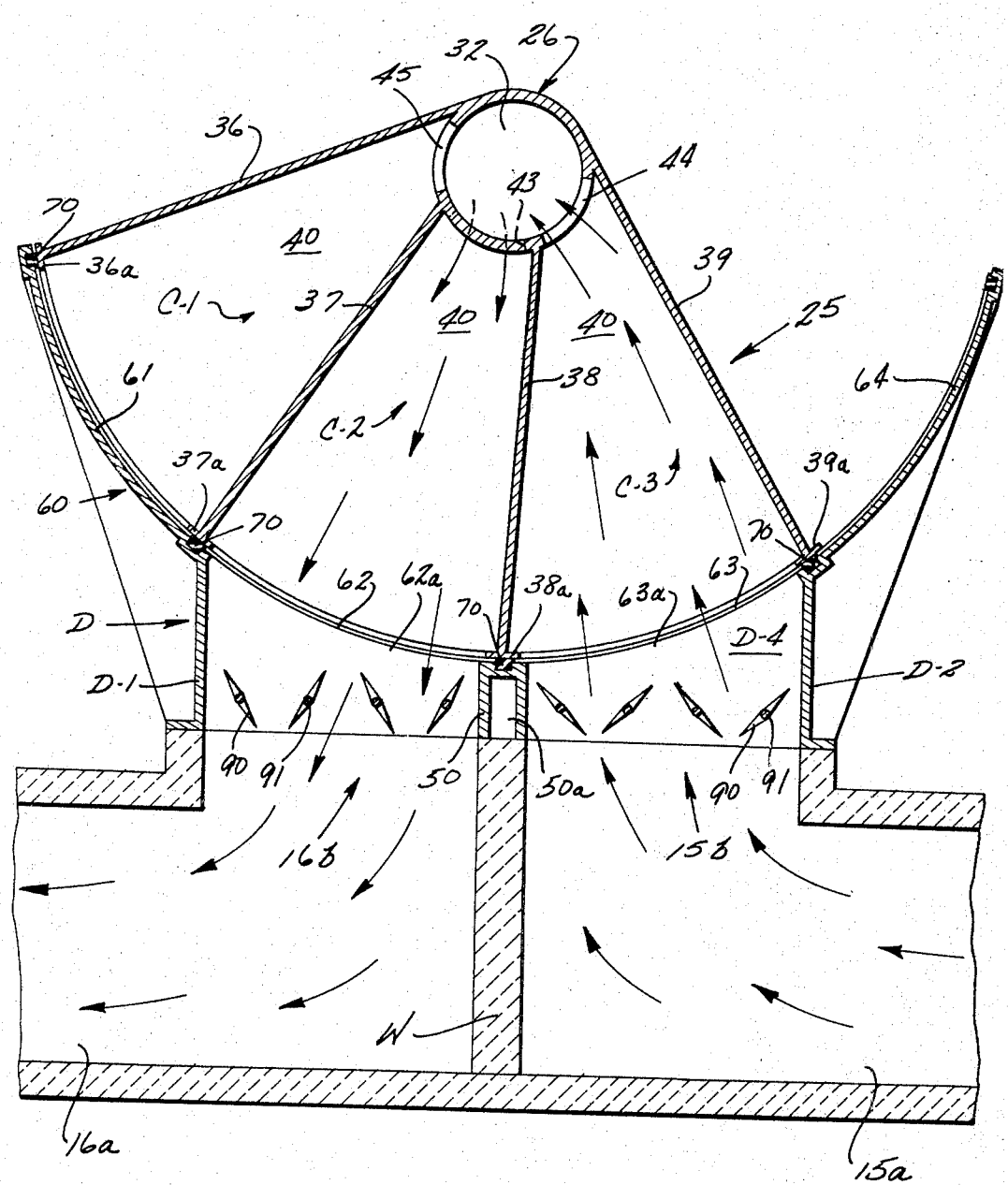

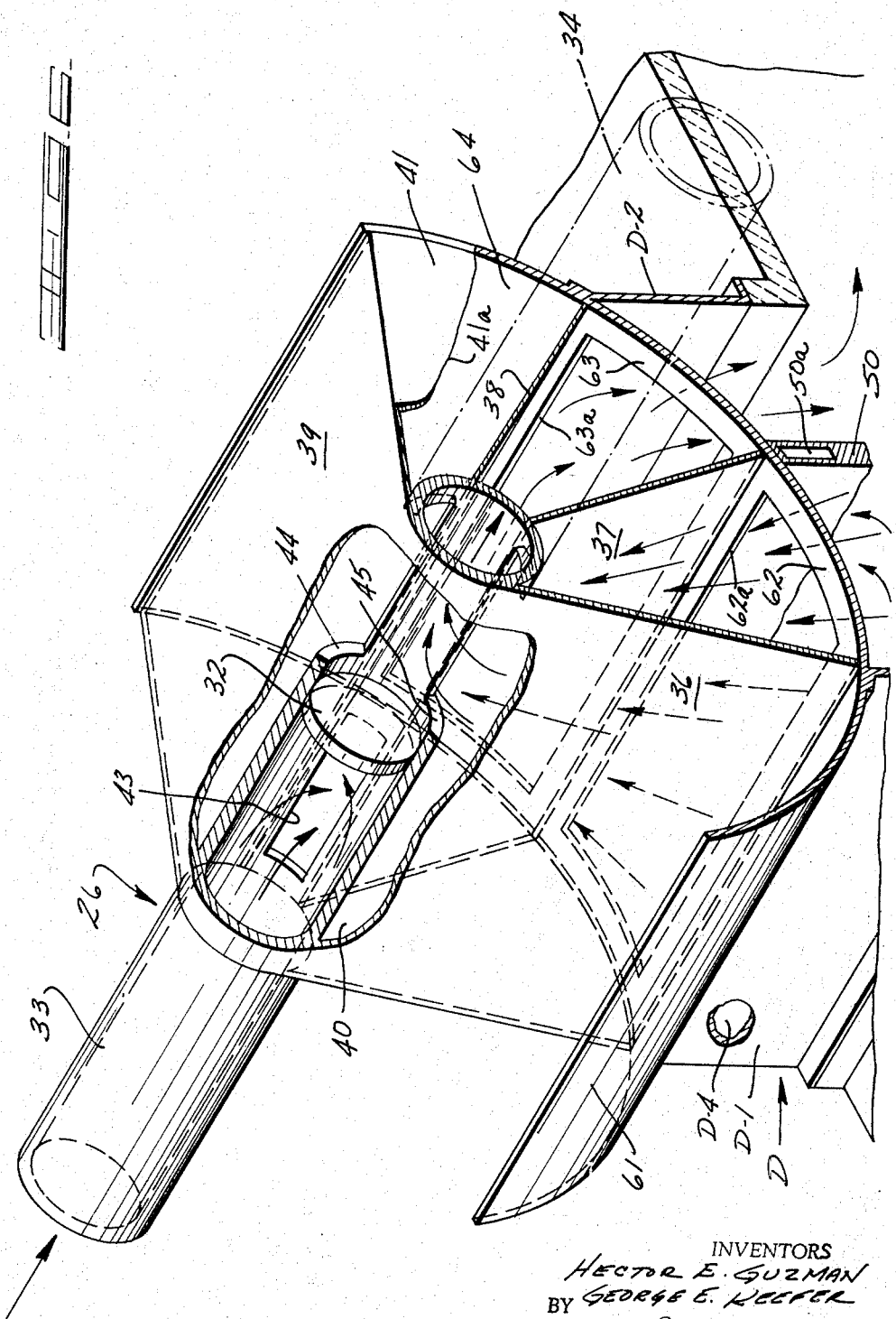

The present invention relates to fluid valving apparatus, e.g., apparatus for controlling the direction in which a given fluid will flow. Considered most broadly, the apparatus of the present invention has utility in any area where it is desired to control the direction in which a given fluid medium flows, particularly with respect to a central zone.

More specifically stated, the present invention relates to apparatus for controlling the flow of inlet combustion air and exhaust gases in a combustion furnace. In combustion furnaces, it is, from a thermal efficiency point of view, frequently desirable to have an arrangement for effecting reversal of flow as concerns the inlet combustion air and the exhaust gases. A furnace incorporating such an arrangement is known in the art as a "regenerative" furnace. A "regenerative" furnace employs a central zone in which combustion of the gaseous fuel takes place in order to provide heat, for melting, etc., and auxiliary components for reversing the flow of the air (including oxygen which is needed to sustain combustion) and the exhaust gases in order to direct these gases in alternating fashion through "heat sinks," as it were, whereby the thermal efficiency of the operation is improved. These "heat sinks" or heat storage chambers are generally located on opposite sides of the combustion zone. These heat storage chambers on either side of a combustion zone are called regenerative chambers. Generally, they are upstanding enclosures; the interior of which contains a plurality of refractory bricks in alternate stacked array leaving voids therebetween which define a tortuous path for the gaseous medium passing therethrough. At the same time, the stacked array of bricks provides a large surface area for adsorption of heat when hot exhaust gases are passed through the regenerative chamber. When flow is reversed, the heat adsorbed from the hot exhaust gases is given off to the incoming fresh combustion air. The entire purpose of the just-described operation is to provide improved thermal efficiency of the gaseous fuel used, in terms of achieving a higher temperature within the combustion zone with a given quantity of fuel. The array of bricks within a regenerative chamber is frequently called a "checker" system or simply "checkers." As indicated, the upstanding regenerative chambers are fluidly connected with the central combustion zone and also, in turn, the regenerative chambers are each in turn fluidly connected with channels or canals which lead away to a point somewhat remote from the combustion zone to terminate individually in ports or openings. The latter are alternately connected to a stack which exhausts the products of combustion. While exhaust gases are being exhausted out the stack, incoming air is introduced into the alternate channel or canal which directs the air to the regenerative chamber containing the stacked array of bricks. With this introduction, it is easy to see that reversal in the flow of gaseous medium in this system, as described, will be desirable from a thermal efficiency point of view. Thus, in a regenerative furnace which includes a pair of regenerative chambers, one on either side, it is common to pass the combustion gases through one regenerative chamber for a given period of time, while the incoming combustion air is drawn through the other regenerative chamber and thence into the principal combustion zone. After a given time, the flow in this system, as just described, is reversed so that the inlet combustion air is directed through the regenerative chamber previously handling the exhaust gases of elevated temperature. Contemporaneously, the hot exhaust gases are drawn out the opposite regenerative chamber whereby the heat is given up to the array of brickwork therein, as described. As a consequence, inlet air proceeding through the regenerative chamber, first on one side and thence the other, absorbs heat which has been extracted just previously from the exhaust gases passing through the regenerative chamber and, as it were, temporarily stored in the bricks.

There are a number of systems and apparatus for effecting reversal of flow in regenerative-type furnaces. Butterfly valves, for example, will serve the purpose of changing the flow of gases within a regenerative system. Butterfly valves are undesirable, however, because they do not effectively seal or isolate the flow of gaseous medium, one from the other. As a consequence, leaks occur and thermal efficiency suffers. Additionally, in combustion furnaces such as glass melting furnaces, it must be appreciated that considerable amounts of waste exhaust gases and fresh combustion air are involved. Consequently, the channels, ductwork, ports, etc., which are necessary to handle such volumes, must be fairly massive. Since these components are massive, the butterfly-type valve must also be large. Due to the considerable heat involved, warpage occurs whereby sealing efficiency due to non-registry of components results. Furthermore, these valves are expensive to operate and, additionally, bearing and support structure is necessarily extensive which adds to the expense.

So-called shifting "turtleback" type reversing valve apparatus is also known in the prior art. These are exemplified, for example, by the constructions illustrated in Meyer U.S. Pat. No. 1,476,534. These are inherently cumbersome, expensive, inefficient and generally undesirable in modern combustion furnace technology. Furthermore, these "turtleback" reversal apparatus do not create good seals and, due to the mass of metal involved, require a considerable cooling which is expensive, otherwise warpage occurs leading to mechanical jamming of the plurality of components, such as levers, etc., involved in such constuction. Both of the reversal valve apparatus described, namely, the butterfly and the "turtleback," require a considerable amount of maintenance due to breakdowns of the many interrelated components involved and the warpage problems enumerated hereinabove.

It is accordingly a principal object of the present invention to provide a reversing-type valve which is of utility in its improved functional operation in effecting reversal of flow of a gaseous medium with respect to a given central zone.

It is another object of the present invention to provide a "reversing" valve which is of particular utility in combination with a "regenerative-type" furnace.

It is still another object of the present invention to provide a reversal valve apparatus which is ideally adapted for use in a regenerative glass melting furnace by reason of the elevated temperatures involved and the extreme thermal efficiency obtained and made possible by the apparatus of this invention.

It is yet another object of the present invention to provide a reversing valve apparatus which is of relative simplified design whereby manufacture can be effected very economically as compared to prior art reversal valves.

It is additionally an object of the present invention to provide a reversing valve of special utility in glass melting "regenerative-type" furnaces which is relatively maintenance-free by reason of the simplified design features generally mentioned hereinabove and more detailedly described hereinafter.

It is another object of the present invention to provide such a reversal apparatus which embodies particular features of design promoting rapid actuation of reversal of the apparatus whereby reversal of flow in the fluid system can be effected most quickly responsive to particular control parameters.

The above-enumerated objects, as well as others, will become apparent to those skilled in the art from the following detailed description taken in conjunction with the annexed sheets of drawings on which there is presented, for purposes of illustrtaion only, a single embodiment of the apparatus of the present invention.

In the drawings:

FIG. 1 is an end elevational view, partly in section and with other portions broken away, of a glass furnace of the "crown top" type having assembled therewith opposed "regenerative" chambers.

FIG. 2 is a plan view of the furnace illustrated in FIG. 1 and includes a general outline of the reversal apparatus of the present invention, albeit in generally schematic form.

FIG. 3 is, in part, a sectional view taken on the line 3—3 in FIG. 2 and, in part, an elevation view of the specific apparatus of the present invention.

FIG. 3a is a partly sectional and a partly elevational view taken on the line 3a—3a in FIG. 3.

FIG. 4 is a sectional view taken on the line 4—4 of FIG. 3.

FIG. 5 is a sectional view very similar to FIG. 4, but showing the apparatus of the present invention in a position opposite from that shown in FIG. 4.

FIG. 6 is a generally three-quarter perspective view of the apparatus of the present invention, but with parts broken away for clarity of illustration.

The apparatus of the present invention will be described and has special utility in connection with a "regenerative" system for a glass melting furnace featuring side-by-side inlet and exit ports or openings in canals leading independently and respectively to the opposed regeneration chambers which lead to the central combustion zone. A reversal valve apparatus situated over the ports, as alluded to hereinbefore, effects an alternate fluid connection of inlet air and exhaust stack to first one port and then the other to effect the reversal of flow.

In accordance with the broad aspects of the present invention, the apparatus involved envisions an elongated hollow tube or pipe which is located above the side-by-side ports, the tube being rotatable and constructed and arranged as to include fluid flow control passageways providing alternate connection of inlet air and exhaust to the ports and, consequently, effecting a reversal of flow in the canals, the regenerative chambers and, ultimately, the central zone; all of the foregoing components being generally connectible in substantial fluid relationship.

In the principal embodiment, the elongated tube is connected at one end to an air supply (usually air blower) and at the other end to an exhaust stack, sometimes augmented by an auxiliary centrifugal blower. Midway between these extremities, a wall isolates the one end of the tube or pipe from the other. Proximate the wall, lateral slots are formed in the tube wall which connect with a depending segmented chamber arrangement; the whole mechanism being rotatable about the axis of the pipe whereby the segmented chambers are alternately connected to one or the other of the upwardly opening ports whereby exhaust is connected via the lateral slots and the segmented chambers to the upwardly opening port and, upon rotation of entire apparatus, forced air at one end of the pipe proceeding through another lateral slot is directed into the segmented chamber and then into the upstanding port. Shifting of this arrangement, as will be more particularly described hereinafter, will effect reversal of flow in the canals which, as has been mentioned, are in turn fluidly connected to a regenerative chamber and thence to the central combustion zone.

Referring now more specifically to the drawings, there is disclosed in FIGS. 1 and 2 a glass melting furnace of the crown-top type, identified by the reference numeral 11. The apparatus of the present invention will be described in an operative assembly with the glass melting furnace. It, of course, should be appreciated that this valving reversal apparatus will find broad application in other regenerative combustion furnaces as well as applications which desirably include arrangements for effecting reversal of flow of gaseous medium with respect to a central zone. The glass melting furnace contains a pool of glass G in a central receptacle 12 formed of refractory. "Doghouse" 13 (FIG. 2) at one end in one form of glass melting furnace provides a zone for introduction of glass forming batch ingredients, while the throat 14 at the opposite end provides for flow of the molten glass to a refiner and ultimately to forehearth channels leading to the glass forming apparatus which process the molten glass and shape it into finished glass goods. The glass melting furnace has, at either side, regenerative chambers 15 and 16. Nozzles 17 extend laterally through the upper region of the regenerative chambers and extend through restricted throat portions 18 between the regenerative furnace and the crown-top portion 19 to project a combustible gas over the pool of molten glass as indicated by the arrows. The nozzles are controlled in a manner well-known in the art to issue the combustible gas from the right-hand nozzles proceeding through the regenerative chamber 15 all at the same time, while the nozzles proceeding laterally through the regenerative chamber 16 are in the off position. Thence, the situation is reversed in synchronous fashion with the exhaust and reversal apparatus of the present invention, as will be described. The regenerative chambers 15 and 16 include, in each case, a stacked array of bricks 20 which therebetween define openings 21 providing a tortuous path for the inlet air in the one case and the exhaust combustion gases in the other.

As shown in FIGS. 1 and 2, the flow of the gaseous medium in the furnace setup is from right to left. The combustion gases pass, as shown, downwardly through the array of bricks in the regenerative chamber 16. From the regenerative chamber 16, the gases proceed through a fluidly connected crown-top canal 16a which terminates in an upwardly facing port 16b. The apparatus of the present invention 25 is situated above the port 16b and directs the exhaust gases, in a manner to be described in more detail, to a stack S (FIG. 2) extending vertically upwards. At the same time, the apparatus 25 serves to direct inlet combustion air through the ductwork D into the port 15b, from which it proceeds laterally through canal 15a, and thence upwardly through the array of brickwork in regenerative chamber 15 wherein it is heated up and thence proceeds laterally through the restricted throat 18 into the combustion zone proper together with fuel gas emanating from nozzle 17 proceeding laterally through regenerative chamber 15. At this time, the nozzles 17a (on the left) proceeding through regenerative chamber 16 are in the off position. The apparatus 25 will be described in more detail later, although it should be noted that the apparatus 25, including the hollow distribution cylinder 26, pivots about the longitudinal axis of the pipe 26 as controlled by the air cylinder C anchored in support, as shown.

The reversing valve apparatus of the present invention is shown in more detail in FIGS. 3, 3a, 4, 5 and 6. Referring to FIGS. 3 and 4, it can be seen that the apparatus 25 is situated above the ports 15b and 16b (FIG. 4). A principal component of the reversal apparatus is the hollow, cylindrical, distribution pipe 26 which is located horizontally above and between the ports 15b and 16b separated by a vertical upstanding wall W. The principal cylindrical member 26 includes, at one end, a flange 26a connecting with a like flange 28a formed on outlet 28 of a cylindrical blower 29 serving to supply fresh air. The opposite end of the pipe 26 includes flange 26b which connects with a like flange 30a on inlet pipe 30 of a centrifugal blower 31 which pulls exhaust gases in the direction indicated by the arrows and directs them to the stack S. This centrifugal blower is powered by a coaxially mounted pulley 31a driven by a belt 31b connected to a motor (not shown). The flanged connections 26a–28a at one end and 26b–30a at the other end are of a sliding type providing a sealing connection but permitting some reciprocal vertical movement of the pipe or tube 26 for a purpose to be described. The distributor pipe 26 includes (intermediate the flanged connections) a transverse wall 32 which, in effect, defines two axially aligned independent chambers; one of which will be termed an inlet chamber 33 on the left since it is connected to the centrifugal inlet blower 29 and the other termed an outlet chamber 34 since it is fluidly connected to the centrifugal outlet blower 31 connected to the stack S. Integrally connected to the hollow cylindrical pipe 26 are radially extending walls 36, 37, 38 and 39 of equal length which terminate at their extremity in flanged elements 36a, 37a, 38a and 39a, respectively. The flanged elements just mentioned lie on a common circle. End walls 40 and 41 which connect with the walls 36, 37, 38 and 39 complete the segmented chamber, subdivided into subchambers by the inner walls 37 and 38. The radially extending walls 36, 37, 38 and 39 define therebetween segmented chambers C–1, C–2 and C–3; which chambers are open at their outer extremities proximate the flanged elements 36a through 39a. Inlet end 33 of the distributor pipe 26 includes a lateral slot 43 (FIGS. 3 and 6). The lateral slot opening 43 connects with subchamber C–2. The exhaust end of the distribution pipe 34 is provided with a pair of lateral slots 44 and 45 which are radially misaligned with each other and with the slot 43. Lateral slot 44 connects with subchamber C–3 as defined between walls 38 and 39, while lateral slot 45 connects with subchamber C–1 as defined between walls 36 and 37. The subchambers are also defined between end walls 40 and 41; the latter being cut away on the cut line 41a (FIG. 6) for clarity of illustration.

An array of ductwork, generally identified by the reference letter D, provides fluid connection between the apparatus 25 and the upwardly facing ports 16b and 15b. The duct includes walls D–1 and D–2 on the side and D–3 and D–4 at each end. A hollow central brick 50 situated at the top of wall W augments the ductwork into adapting the ports to a condition mateable with the apparatus 25. Passageway 50a in brick 50 is used for circulation of temperature control gases in conventional fashion. The ductwork includes a top cylindrical wall 60 which includes a segment 61 in the nature of a wing segment proceeding upwardly to the left of port 16b, a connected segment 62 which spans the ductwork above port 16b, a connected segment 63 which spans the ductwork above port 15b and another connected wing segment 64 which proceeds therebeyond, as indicated. The segments 61, 62, 63 and 64 together are definitive of a segment of a surface of a cylinder identified by the reference numeral 60, as mentioned. Segment 62 includes an opening 62a, while segment 63 includes an opening 63a. Wing segments 61 and 64 do not contain any openings. The upper edges of the ductwork and the upper marginal edges of the cylindrical component 60 include a recessed resilient packing strip, as it were, identified by the reference numeral 70 (FIG. 4), providing thereby good sealing engagement between the flange segments 36a, 37a, 38a and 39a with the edges of the cylindrical ductwork component 60.

As illustrated in FIGS. 3, 4 and 6, inlet air is urged by means of the centrifugal blower 39 through the inlet end 33 of the cylindrical pipe and this proceeds through lateral slot 43 down into subchamber C–2 and thence through opening 63a (in segment 63 of upper wall 60) to pass into the ductwork D and thence through the port 15b into the canal 15a from which the inlet air proceeds into the regenerative chamber 15 and thence contemporaneously with the flame issuing from nozzle 17 into the combustion zone above the pool of glass G. Simultaneously, exhaust gases proceed (referring to FIG. 1) laterally to the left and then downwardly through regenerative chamber 16 in canal 16a, thence upwardly through port 16b and the ductwork D through opening 62a (in segment 62 of upper wall 60) and thence into subchamber C–1 formed in the apparatus 25, as described. From subchamber C–1, the exhaust gases pass through the lateral slot 45 into the distributor pipe outlet segment 34 and thence into the exhaust blower 31 and finally up the stack S. Within the confines of the ductwork are situated a plurality of rotatable vanes or deflector blades 90 which are pivotable about shaft 91 in alternate fashion in order to vary the degree of cross sectional freedom and thereby change or modify the relative flow rate of combustion air and exhaust gases through the system as described in combination with the supply air blower and the exhaust blower.

As indicated earlier herein, air cylinder C (FIG. 1) serves to shift the apparatus composed of the distributor pipe 26 and the integral radially extending walls 36 through 39 from one position to the other in order that the flow within the system can be reversed. Consistent with this movement, there is provided a pair of air cylinders 80 provided with an inlet 80a and an outlet 80b. Shaft 80c projecting upwardly from the air cylinder 80 connects with a bifurcated support 80d having like legs 80e on the one side and 80f on the other. The legs of the support 80d each bear a pair of rollers 80g which together constitute a set of four rollers on each side which define, as it were, a rotation-accommodating cradle for the distributor pipe or cylinder 26 in a manner shown in FIG. 3a. Operation of the air cylinders 80, as accommodated by the sliding flange connections 26a–28a and 26b–30a, permits the apparatus in its entirety, including the segmented chamber, to be lifted slightly whereupon activation of air cylinder C will rotate the apparatus from a position, for example, as shown in FIG. 4, to the position shown in FIG. 5. At this position, flow conditions as controlled by the air supply blower 29 and the exhaust blower 31 will effect a reversal of flow within the ports, the canals, the regeneration chambers and, consequently, the central combustion zone. Reference to FIGS. 4 and 5 reveals that the wing segments 61 and 64 of upper wall 60 effectively close subchambers C–3 on the one hand in FIG. 4 and subchamber C–1 in FIG. 5, whereupon flow exists only in the other two chambers.

With the foregoing description, it will be readily appreciated that the various components provide convenient reversal of flow of a gaseous system having a central zone wherein reversal of gaseous flow therein is desired. The reversal can easily be effected by synchronous timed operation of the air cylinders 80 and C to achieve the positions illustrated by FIGS. 4 and 5. Variation in the flow rate is easily effected by an appropriate control of the attitude of the vane or deflector blades 91 in conjunctiton with the control of the speed of the centrifugal air supply blower 29 and the exhaust blower 31.

It is believed readily discernible by those skilled in the art that the valving apparatus as described herein is of relatively simple construction and therefore can be fabricated at a minimum of expense. Additionally, shifting of the components involves a minimum of moving parts whereby maintenance is a minimum factor.

Modifications may be resorted to without departing from the spirit and scope of the appended claims.

We claim:

1. An improved manifold valving apparatus for effecting alternate flow in a central zone connecting with an inlet port and an outlet port, said manifold apparatus comprising:

a hollow tubular member having opposed ends, one of which is adapted for connection to an air supply and the other of which is adapted for connection to an exhaust, said tubular member having a generally cylindrical wall viewed in section, an inner partition separating said air-supply end from said exhaust end, slots extending through said cylindrical wall, one of which lies in said air-supply end and at least one of which resides with said exhaust end, means for mounting said tubular member in proximity to said ports, means for shifting said tubular member rotatably on its axis and means for connecting said slots with said ports alternately.

2. Apparatus as claimed in claim 1, in which said last means includes:

radially extending chambers integrally secured to said tubular member, each chamber embracing a separate slot, adapter ductwork situated embracingly over said ports and including a passageway for each port, said chambers and said ductwork having outlets and inlets respectively which are compatible with rotatable shifting of said tubular members and extending chambers.

3. A valve for effecting reverse flow in a central zone having opposed passageways terminating in ports in proximate relationship, said valve including:

an elongate tube, means dividing said tube into fluidly isolated halves, each of which contains an opposed end of said tube, said ends being adapted to connect respectively with a source of air and an exhaust, chamber means attached to said tube defining three radially extending, independent chambers, slot openings in said tube, one of which in one half connects with one of said chambers and at least two in the other half communicating independently with at least two of said other chambers and means for alternately rotating said tube on its axis to bring said chambers into alternate communicating alignment with said ports.

4. A valve for effecting reverse flow in a central zone having opposed passageways terminating in ports in proximate relationship, said valve including:

an elongate tube, means dividing said tube into fluidly isolated halves, each of which contains an opposed end of said tube, said ends being adapted to connect respectively with a source of air and an exhaust, radial chamber means attached to said tube defining three radially extending, independent chambers, slot openings in said tube, one of which in one half connects with one of said chambers and at least two of which in the other half communicates independently with at least two of said other chambers, said chambers each terminating outwardly in edges lying in a common cylindrical plane, adapter ductwork situated fluidly over said ports, said ductwork having edges complementary to the edges of said chambers, and defining side-by-side passageways connecting individually with said ports, and means for alternately rotating said tube on its axis to bring said chambers into alternate communicating alignment with said passageways.

5. A valve for reversing flow in side-by-side ports leading via independent canals to a central zone, said valve including:

a rotatable tube-like member, a plurality of wall members extending radially therefrom, end wall members connecting the ends of said radially extending walls to define together radially extending chambers, said tube-like member including opposed open ends, one of which is adapted to connect to an air supply and the opposite end is adapted to connect with an exhaust, said tube including a central transverse wall isolating one end from the other, said tube including a lateral slot opening on the side of said wall connecting with the supply air and at least two lateral slot openings on the side of said wall connecting with exhaust, said slot openings being radially misaligned and means for alternately rotating said tube-like member on its own axis to alternately align said ports and chambers via said slots whereby flow is reversed in alternate fashion.

6. A valve for reversing flow in side-by-side ports leading via independent canals to a central zone, said valve including:

a rotatable tube-like member, a plurality of wall members extending radially therefrom, end wall members connecting the ends of said radially extending walls to define together radially extending chambers, said tube-like member including opposed open ends, one of which is adapted to connect to an air supply and the opposite end is adapted to connect with an exhaust, said tube including a central transverse wall isolating one end from the other, said tube including a lateral slot opening on the side of said wall connecting with the supply air and at least two lateral slot openings on the side of said wall connecting with exhaust, said slot openings being radially misaligned, means for alternately rotating said tube-like member on its own axis to alternately align said ports and chambers via said slots whereby flow is reversed in alternate fashion and adapter ductwork means for providing essentially releasably fluid-sealed connection between said chambers and said ports.

7. A valve for effecting reverse flow in a central zone connecting with an inlet port and an outlet port at a proximate location remote from said central zone, said valve including a segmented chamber, said chamber including subchambers in side-by-side radially extending relationship, said chamber including an integral hollow, central distribution tube, means dividing said tube into two tubular halves, one of which connects to a source of air and the other connects to exhaust, lateral slots formed in the tube wall connecting the air source half to one subchamber and the exhaust half to two of said subchambers and means for rotating said segmented chamber to and fro between several positions, in which said one subchamber is proximate first one and then the other of said ports while said two subchambers are alternately proximate said ports.

8. A valve for effecting reverse flow in a central zone connecting with an inlet port and an outlet port at a proximate location remote from said central zone, said valve including a segmented chamber, said chamber including subchambers in side-by-side radially extending relationship, said chamber including an integral hollow, central distribution tube, means dividing said tube into two tubular halves, one of which connects to a source of air and the other connects to exhaust, lateral slots formed in the tube wall connecting the air source half to one subchamber and the exhaust half to two of said subchambers, means for rotating said segmented chamber to and fro between several positions, in which said one subchamber is proximate first one and then the other of said ports while said two subchambers are alternately proximate said ports and means providing sealing engagement between said subchambers and said ports.

9. A reversal valve for effecting reverse flow in a central zone having independent opposed passageways leading to side-by-side ports at a location remote from said central zone, said valve including ductwork adapted to embrace said ports, said ductwork including independent passageways, one for each port, and an upper edge lying in a common cylindrical plane of concavity, said edge defining two openings, one for each passageway, a chamber of segmented cylindrical contour situated nestably down within said ductwork, said chamber including subchambers in side-by-side radially extending relationship, said chamber including a distribution pipe, means dividing said pipe into two halves, one of which is adapted to connect to a source of supply air and the other is adapted to connect to exhaust, lateral slots formed in said pipe connecting one of said halves to one subchamber and the other of said halves to other of said subchambers, means for rotatably shifting said segmented chamber to and fro between one position wherein said subchambers are connected to said ductwork passageways in one way and a second reversed position and means providing sealing engagement between said segmented chamber and said ductwork.

10. A valve apparatus adapted to effect a reversal in fluid flow in side-by-side first and second ports leading independently to a central zone desirably subjected to reverse fluid flow, said apparatus comprising:

an elongate hollow tube member having opposed ends, one of which is adapted to connect with an inlet supply of fluid and the other of which is adapted to connect with an exhaust, means for locating said tube horizontally between said first and second ports, an inner partition within said tube dividing said tube into an inlet section and an outlet section independent of the other, wall means extending radially from said tube to define a plurality of independent adjacent chambers, a slot passageway formed in said tube in said inlet section, said passageway communicating with one of said chambers, slot passageways formed in said tube in said outlet section communicating independently with other of said plurality of chambers and means for moving said tube rotatably on its axis, between two positions, one of which locates one chamber over the first port and the other of which locates the same chamber over the second port while one of the other chambers is located over the alternate port.

11. A valve apparatus adapted to effect a reversal in fluid flow in side-by-side first and second ports leading independently to a central zone desirably subjected to reverse fluid flow, said apparatus comprising:

an elongate hollow tube member having opposed ends, one of which is adapted to connect with an inlet air supply and the other of which is adapted to connect with an exhaust.

means for locating said tube horizontally above and between said first and second ports, an inner partition spanning said tube to divide said tube into an inlet section and an outlet section, said sections being fluidly independent, wall means extending radially from said tube to define three independent adjacent chambers, a slot formed in said tube in said inlet section, said slot communicating with the innermost of said three chambers, two slots formed in said tube in said outlet section, each communicating independently with a different one of said two outer of said three chambers, means for moving said tube rotatably on its axis, between two positions, one of which locates the inner chamber over the first port and the other of which locates the inner chamber over the second port whereby first one outer chamber is over the second port and secondly the other outer chamber is over the first port and means for sealing said outer chambers alternately when said particular outer chamber is not located over a port.

12. A valve apparatus adapted to effect a reversal in fluid flow in side-by-side first and second ports leading independently to a central zone desirably subjected to reverse fluid flow, said apparatus comprising:

an elongate hollow tube member having opposed ends, one of which is adapted to connect with an inlet air supply and the other of which is adapted to connect with an exhaust, means for locating said tube horizontally above and between said first and second ports, a wall within said tube dividing said tube into an inlet section and an outlet section independent of each other, three independent adjacent chambers integrally formed on said tube wall and extending radially outwardly, a slot passageway formed in said tube in said inlet section, said passageway communicating with the innermost of said three chambers, two slot passageways formed in said tube wall in said outlet section communicating independently with the two outer of said three chambers and means for moving said tube rotatably on its axis, between two positions, one of which locates the inner chamber over the first port and the other position locates the inner chamber over the second port whereby first one outer chamber is located over the second port and secondly the other outer chamber is over the first port.

13. Valving apparatus for regenerative furnace canals provided with an inlet and outlet ports situated in side-by-side relationship, said apparatus comprising:

a base duct member adapted to enclose said ports, said duct member having a center wall dividing said duct member into two adjacent passageways adapted for substantially sealing registry with said ports, said duct including upper edges outlining said passageways lying in a common cylindrical plane, a rotatable cylinder-like member situated horizontally above and between said passageways, said member including radially disposed walls, the outermost extremities of which lie substantially in the same plane as said upper edges of said ductwork, said walls defining adjacent chambers, means for rotating said cylinder-like member on its cylindrical axis to effect alternate connection between said chambers and said passageways and a distributor conduit of generally tubular configuration situated within said chamber and generally coincident with the axis of rotation of said member, said tubular conduit including a central transverse wall, said tubular conduit having opposed open ends, one on either side of said transverse wall, one of which is adapted to connect with supply air and the other is adapted to connect with an exhaust, said tubular conduit including a lateral slot connecting said air supply end with one of said chambers, said tubular conduit including at least one other lateral slot connecting said exhaust end with another of said chambers.

14. In a furnace composed of (1) a principal firing zone, (2) opposed regenerative chambers connecting with said zone for alternate contact with (a) exhaust products of combustion and (b) introduced combustion air, said chambers extending independently to a location remote from said zone and each terminating in an upwardly open port situated in side-by-side relationship with the other port, an improved manifold valving apparatus for effecting alternate flow in said regenerative chambers and said firing zone, said manifold apparatus comprising:
- a hollow tubular member having opposed ends, one of which is adapted for connection to an air supply and the other of which is adapted for connection to an exhaust, said tubular member having a generally cylindrical wall viewed in section,
- a transverse partition separating said air-supply end from said exhaust end,
- slots extending through said cylindrical wall, one of which connects with said air-supply end and one of which connects with said exhaust end,
- means for shifting said tubular member rotatably on its axis and
- means for connecting said slots with said ports alternately.

15. In a furnace composed of (1) a principal firing zone, (2) opposed regenerative chambers connecting with said zone for alternate contact with (a) exhaust products of combustion and (b) introduced combustion air, said chambers extending independently to a location remote from said zone and each terminating in an upwardly open port situated in side-by-side relationship with the other port, an improved manifold valving apparatus, for effecting alternate flow in said regenerative chambers and said firing zone, said manifold apparatus comprising:
- a hollow tubular member having opposed ends, one of which is adapted for connection to an air supply and the other of which is adapted for connection to an exhaust,
- said tubular member having a generally cylindrical wall viewed in section,
- a central transverse partition within said tubular member separating said air-supply end from said exhaust end,
- slots extending through said cylindrical wall, one of which lies in said air-supply end and one of which lies in said exhaust end,
- radially extending walls formed on said tubular member defining adjacent chambers, said slots leading to different chambers and
- means for shifting said tubular member rotatably on its axis in to and fro fashion whereby said chambers are alternately connected to said ports.

16. A valve for reversing fluid flow conditions in a central zone having two passageways leading therefrom to two spaced ports situated in proximate side-by-side relationship, said valve including:
- a segmented chamber including three side-by-side independent subchambers extending essentially divergently from a common axis,
- means for shifting said chamber between two positions, one position fixing the innermost subchamber over one of said ports whereby one of the outermost subchambers will lie over the other of said ports, the other position fixing the innermost subchamber fluidly over the other of said ports, whereby the other of the outermost subchambers will lie over the alternate port,
- means establishing fluid communicating relationship between said ports and subchambers in either of said positions,
- means for sealing said outer subchambers when not situated over a port,
- an elongate distributor tube including two fluidly independent sections, one of which is adapted to connect to supply air and the other of which is adapted to connect to exhaust,
- means for effecting fluid connection between said inlet section and the innermost of said subchambers and
- means for alternate fluid connection of first one outer subchamber and then the other outer subchamber with said exhaust section.

References Cited

UNITED STATES PATENTS 3,170,678    2/1965    Keefer _____ 137—309 X
3,170,680    2/1965    Keefer _____ 137—309 X M. CARY NELSON, *Primary Examiner.*

H. T. KLINKSIEK, *Assistant Examiner.*